United States Patent [19]

Lee

[11] Patent Number: 5,742,152

[45] Date of Patent: Apr. 21, 1998

[54] CONTINUOUSLY RECTIFIABLE LINEARITY COIL CIRCUIT

[75] Inventor: Hsiu-Chyi Lee, Taipei, Taiwan

[73] Assignee: Chuntex Eletronic Co., Ltd., Taiwan

[21] Appl. No.: 621,095

[22] Filed: Mar. 22, 1996

Related U.S. Application Data

[63] Continuation-in-part of Ser. No. 620,224, Mar. 22, 1996, abandoned, which is a continuation of Ser. No. 348,212, Nov. 28, 1994, abandoned.

[30] Foreign Application Priority Data

May 12, 1994 [CN] China .................. 94105692.9

[51] Int. Cl.$^6$ ...................................... G05F 1/56
[52] U.S. Cl. ...................................... 323/273
[58] Field of Search ...................... 323/268, 270, 323/273, 301, 303, 355

[56] References Cited

U.S. PATENT DOCUMENTS

| | | | |
|---|---|---|---|
| 4,935,675 | 6/1990 | Ochiai | 315/371 |
| 5,019,749 | 5/1991 | Ito | 315/224 |
| 5,028,862 | 7/1991 | Roth | 323/273 |
| 5,258,701 | 11/1993 | Pizzi et al. | 323/269 |

*Primary Examiner*—Matthew V. Nguyen
*Attorney, Agent, or Firm*—Beveridge, DeGrandi, Weilacher & Young, LLP

[57] ABSTRACT

A continuously rectifiable linearity coil circuit having a saturated transformer serially connected with a deflection yoke of a computer monitor, a linearity coil and a control circuit. In a nearly saturated state, the inductance of the saturated transformer decreases when the input DC current increases. Accordingly, by changing the value of the current passing through the linearity coil, the wave form of the deflection current passing through the deflection yoke is changed so as to keep the horizontal linearity of the computer monitor optimal with respect to different input horizontal frequency signals.

3 Claims, 5 Drawing Sheets

```
*Tr: Deflection Transistor      T: Transformer
 Dd: Damper diode                DY: Deflection Yoke
 Co: Tnuing Capacitor            LH: Linearity Coil
 FBT: Flyback Transformer        Cs: S-Curve Capacitor
 HV: High Voltage
 B+: Supply DC Voltage
```

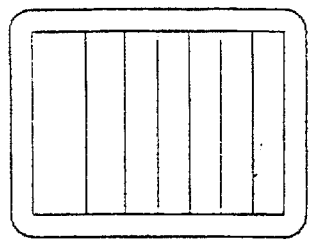
Fig 2  PRIOR ART
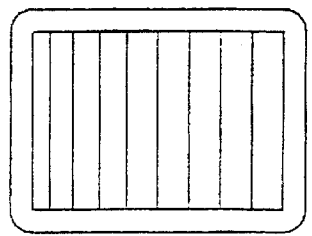
Fig 3  PRIOR ART
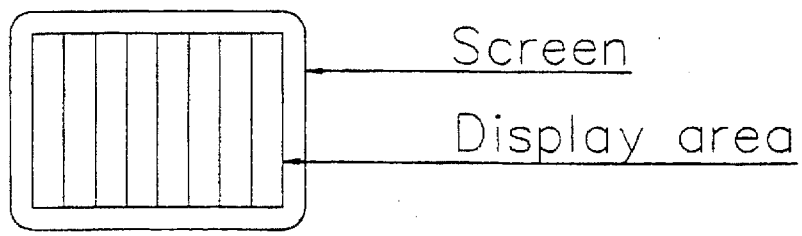
Fig 4  PRIOR ART
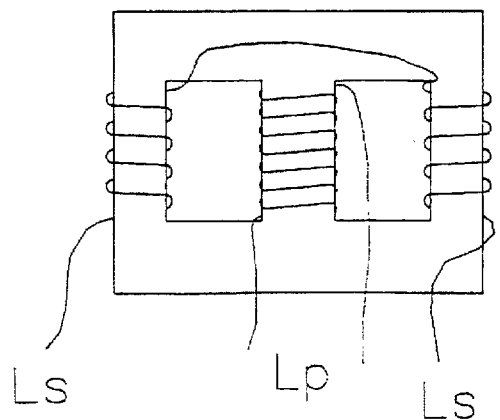
Fig 6

\*Tr: Deflection Transistor
Dd: Damper diode
Co: Tnuing Capacitor
FBT: Flyback Transformer
HV: High Voltage
B+: Supply DC Voltage T: Transformer
DY: Deflection Yoke
LH: Linearity Coil
Cs: S-Curve Capacitor

CONTINUOUSLY RECTIFIABLE LINEARITY COIL CIRCUIT This application is a continuation-in-part of U.S. patent application Ser. No. 08/620,224, filed Mar. 22, 1996, now abandoned, which is a continuation of U.S. patent application Ser. No. 08/348,212, filed Nov. 28, 1994, now abandoned.

BACKGROUND OF THE INVENTION

The present invention relates to a continuously rectifiable linearity coil circuit for rectifying the horizontal linear distortion of a computer monitor. By means of changing the value of the current passing through the linearity coil, the curve of the deflection current passing through the deflection yoke is changed so as to keep the horizontal linearity of the computer monitor optimal with respect to different input horizontal frequency signals.

In the horizontal deflection circuit of a conventional television or computer monitor as shown in FIG. 1, the pulse voltage input by the H-drive stage is amplified by means of the interaction of the deflection transistor Tr, dampping diode Dd and tuning capacitor Co and added to the deflection Yoke DY in order to generate saw-tooth current so as to control the electronic beam emitted from the CRT for horizontal scanning. Also, in cooperation with the flyback transformer FBT, the movement of the deflection portion and generation of the high voltage HV are completed.

According to the above arrangement, in the output circuit of the horizontal deflection as shown in FIG. 1, the affection of the deflection transistor Tr, dampping diode Dd, deflection Yoke, etc. leads to the horizontal linear distortion of the picture as shown in FIGS. 2 and 3. The proportions in the horizontal direction of the picture are not unified. Therefore, generally a linearity coil LH and an S-curve capacitor Cs are serially connected with the deflection yoke for rectifying the horizontal linear distortion and unifying the respective proportions in horizontal direction as shown in FIG. 4.

Most of the traditional computer monitors work under multi-frequency condition so that the horizontal linear distortion must be rectified with respect to different horizontal frequencies. In the traditional horizontal deflection output circuit, a staged horizontal linearity coil compensation circuit as shown in FIG. 5 is used, which divides the entire horizontal frequency range into several small divisions according to different horizontal frequency compensation points. When different horizontal frequencies are input, according to the divisions thereof, electronic element such as relay, mosfet, etc. are switched on/off to make multiple sets of inductor coils or capacitors perform the compensation with respect to different frequencies. This pertains to a discontinuous compensation measure. The drawback of such circuit resides in that the theoretic discontinuity can hardly achieve a desired compensation effect with respect to the entire horizontal frequency. In the case that the input horizontal frequency is between two compensation points, the optimal compensation amount cannot be achieved. This results in a deflection amount which still causes horizontal linear distortion as shown in FIGS. 2 and 3. Moreover, the more sets of elements are used for linear distortion compensation, the higher manufacturing cost is needed.

SUMMARY OF THE INVENTION

It is therefore a primary object of the present invention to provide a continuously rectifiable linearity coil circuit including a control circuit, a saturated transformer and a linearity coil. According to the frequency of the input horizontal signal, the control circuit generates different values of input current for controlling the change of the inductance of the secondary side of the saturated transformer. Accordingly, the value of the current passing through the linearity coil can be controlled in order to achieve optimal horizontal linearity of the computer monitor under different horizontal frequency signals.

The present invention can be best understood through the following description and accompanying drawing, wherein:

BRIEF DESCRIPTION OF THE DRAWINGS

FIGS. 2 and 3 show the horizontal linear distortion of the picture existing in the conventional horizontal deflection output circuit;

FIG. 4 shows a normal picture with unified proportions of the respective areas in horizontal direction;

FIG. 6 shows the saturated transformer of the present invention;

DETAILED DESCRIPTION OF THE PREFERRED EMBODIMENT

Figure 1:
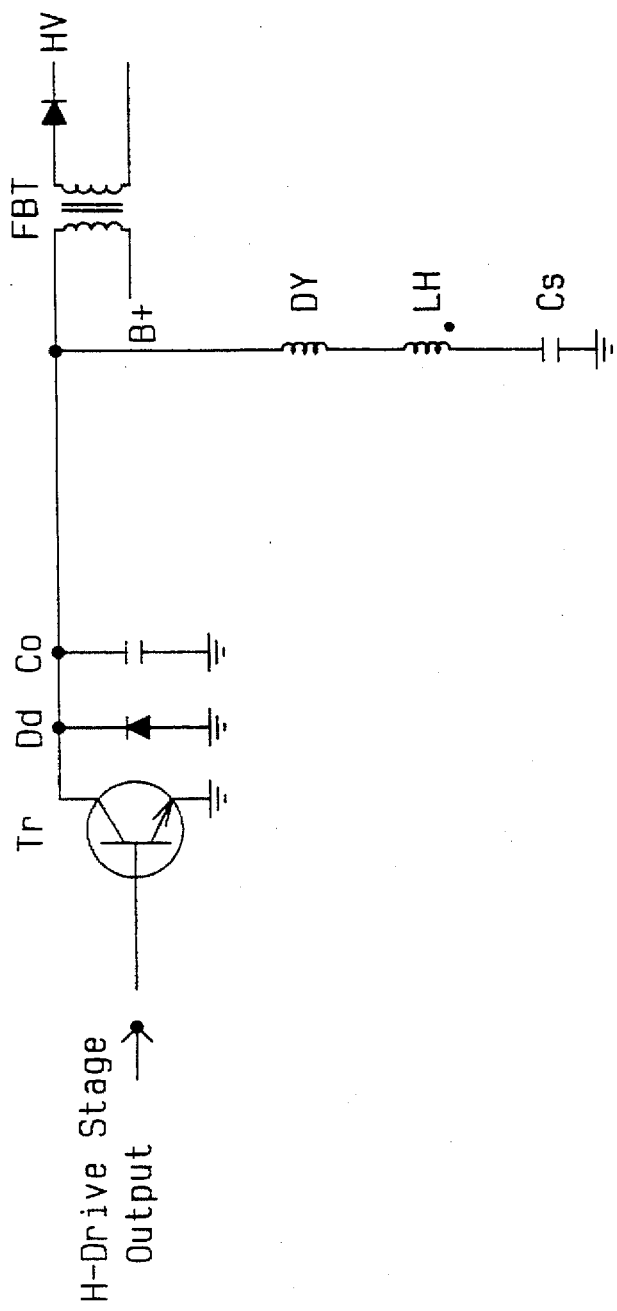
FIG. 1 shows a conventional horizontal deflection output circuit of a television or computer monitor.
Figure 5:
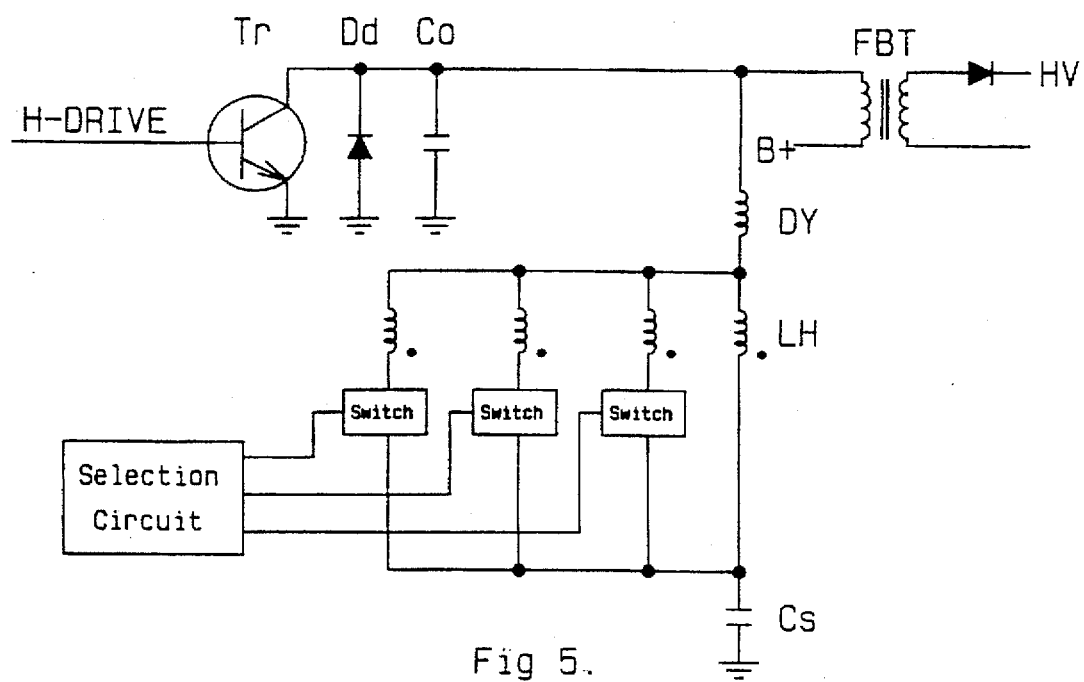
FIG. 5 shows the staged horizontal linearity coil compensation circuit used in the conventional horizontal deflection output circuit.
Figure 7:
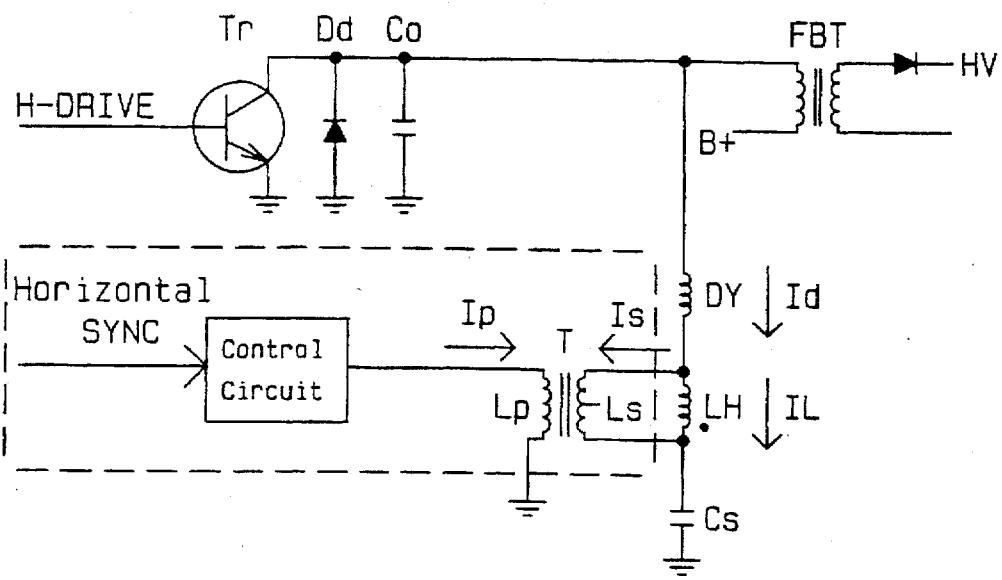
FIG. 7 shows the continuously rectifiable linearity coil circuit of the present invention.

Please refer to FIG. 7. As enclosed by the phantom lines therein, the continuously rectifiable linearity coil circuit of the present invention mainly includes a control circuit, a saturated transformer T and a linearity coil LH. The control circuit basically is a circuit which is able to output a proportional current according to the frequency of the input horizontal signal, that is, a frequency-to-current converter.

The saturated transformer T is an EI type iron core transformer as shown in FIG. 6. Such transformer is used under a nearly saturated condition and has a specific winding design. On the primary side Lp, the winding includes very large number of loops, while on the secondary sides Ls, the windings are symmetrical and include small number of loops respectively. Therefore, when little DC current Ip passes through the primary side, the magnetic flux of the iron core is nearly in the saturated state so that the inductance of the secondary side becomes low. When greater current passes through the primary side Lp, the inductance of the secondary side becomes less and the current Is passing through the secondary side Ls is increased. Because the current Id for keeping the width of the picture unified is constant and Id=Is+IL, when Is increases, IL decreases. Therefore, the inductance of the parallel linear coil LH is relatively changed and thus the wave form of the deflection current passing through the deflection yoke DY is changed so as to achieve the object of continuous rectification of the linear distortion.

Figure 8:
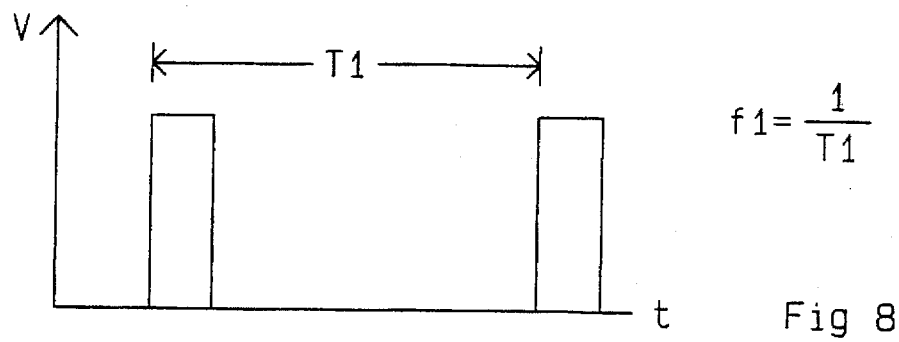
FIGS. 8 and 9 respectively show the low frequency horizontal synchronous signal and high frequency horizontal synchronous signal input to the control circuit.
Figure 9:
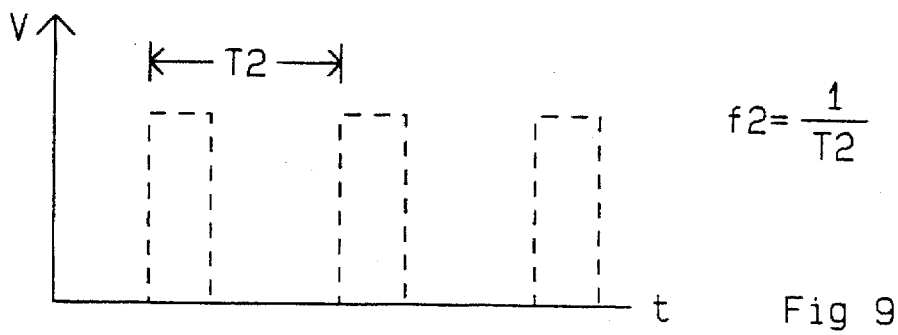
Figure 10:
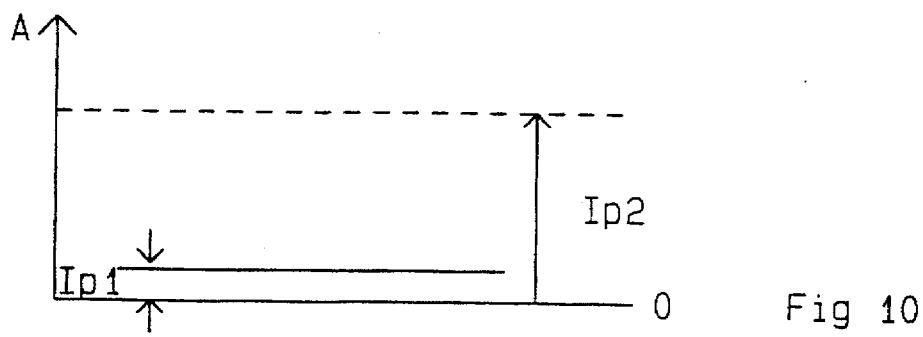
FIG. 10 shows the current generated by the control circuit with respect to the low frequency and high frequency shown in FIGS. 8 and 9.
Figure 11:
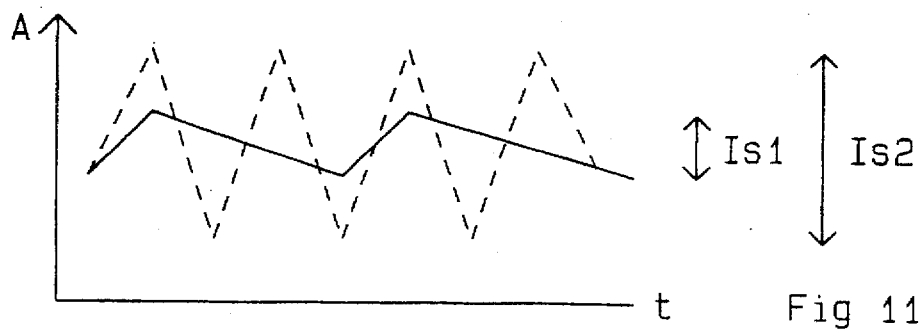
FIG. 11 shows the current of the secondary side of the saturated transformer.
Figure 12:
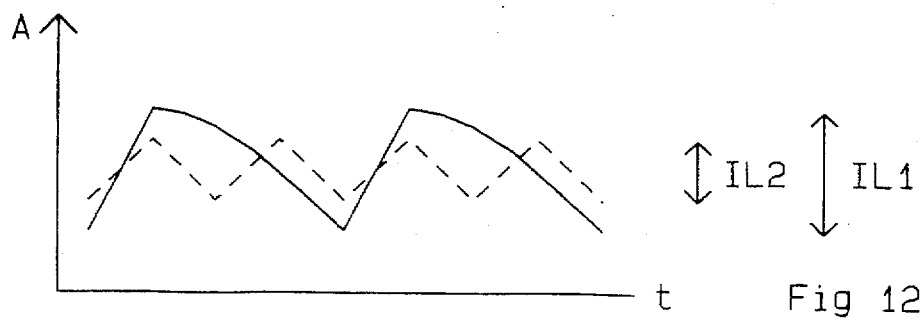
FIG. 12 shows the current of the linearity coil.

With respect to actual application of the embodiment of FIG. 7, after a horizontal synchronous signal of low frequency f1=31 KHz (referring to FIG. 8 or high frequency f2=64 KHz (referring to FIG. 9) is input to the control circuit, a DC current Ip1 or Ip2 is generated and input to the primary side Lp of the saturated transformer T. (Referring to FIG. 10, the solid line indicates that the current Ip1 is less in the case of low frequency and the phantom line indicates that the current Ip2 is greater in the case of high frequency.) The current Is of the secondary side Ls of the saturated transformer T is in proportion to the current Ip. (Referring to FIG. 11, the solid line represents the current Is1 in the case of low frequency and the phantom line represents the current Is2 in the case of high frequency.) For the same size of picture, with respect to different horizontal frequencies, the value of the current passing through the deflection yoke DY should be the same, so that regardless of the high and low frequencies, only if the condition is identical, the total amount of the AC current of Is and IL will be the same. The total amount of the current Is of the secondary side Ls and the current of the deflection yoke of the saturated transformer T is equal to the current amount Id passing through the deflection yoke DY, so that the current Is of the secondary side Ls is in inverse proportion to the current IL of the linearity coil LH. (Referring to FIG. 12, the solid line represents the current IL1 in the case of low frequency and the phantom line represents the current IL2 in the case of high frequency.) Therefore, the inductance of the linearity coil LH can be determined by controlling the value of IL, whereby in low frequency state, the inductance of the linearity coil LH increases, while in the high frequency state, the inductance of the linearity coil LH decreases. Accordingly, the wave form of the deflection current passing through the deflection yoke DY can be changed to achieve the object of continuous rectification of the linear distortion.

It is to be understood that the above description and drawings are only used for illustrating one embodiment of the present invention, not intended to limit the scope thereof. Any variation and derivation from the above description and drawings should be included in the scope of the present invention.

What is claimed is:

1. A continuously rectifiable linearity coil circuit comprising a saturated transformer serially connected with a deflection yoke of a computer monitor, a linearity coil and a control circuit, wherein in a nearly saturated state, the inductance of the saturated transformer decreases when the input DC current increases, so that by means of changing the value of the current passing through the linearity coil, the horizontal linearity of the computer monitor is kept optimal with respect to different input horizontal frequency signals.

2. A continuously rectifiable linearity coil circuit as claimed in claim 1, wherein the saturated transformer works under a nearly saturated condition and on primary side has a winding with very large number of loops, while on secondary sides has symmetrical windings with small number of loops respectively, whereby when little DC current passes through the primary side, the inductance of the transformer is varied and the current passing through the secondary side is changed.

3. A continuously rectifiable linearity coil circuit as claimed in claim 2, wherein by means of the winding with large number of loops on the primary side, the transformer also serves to store energy, whereby in the case that the control current is a very little DC current or a pulse current, a DC current with very little ripple current so that great control current is unnecessary.

* * * * *